No. 876,786. PATENTED JAN. 14, 1908.
N. W. EMMER.
CORN POPPER.
APPLICATION FILED JULY 10, 1907.

Witnesses
Frank B. Hoffman
N. Allen

Inventor
Nichols W. Emmer
By Victor J. Evans
Attorney

UNITED STATES PATENT OFFICE

NICHOLS W. EMMER, OF GAS, KANSAS.

CORN-POPPER.

No. 876,786.   Specification of Letters Patent.   Patented Jan. 14, 1908.

Application filed July 10, 1907. Serial No. 383,101.

*To all whom it may concern:*

Be it known that I, NICHOLS W. EMMER, a citizen of the United States, residing at Gas, in the county of Allen and State of Kansas, have invented new and useful Improvements in Corn-Poppers, of which the following is a specification.

The invention relates to an improvement in corn poppers, primarily constructed for use with any desired form of heater and adapted for evenly heating corn in a manner to avoid burning the same without the necessity of agitating the container in the usual manner.

The main object of the present invention is the provision of a corn popper including means for continuously agitating the corn by elevating it from the heated surface whereby all liability of burning the corn in popping is avoided and the kernels evenly heated and distributed.

The invention will be described in the following specification, reference being had particularly to the accompanying drawings, in which:—

Figure 1:
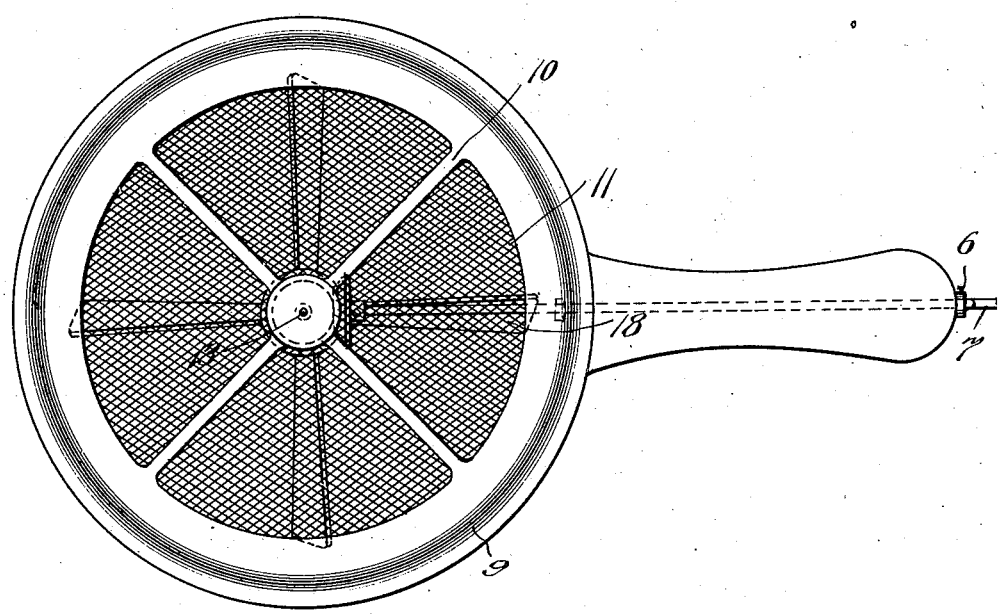
Figure 2:
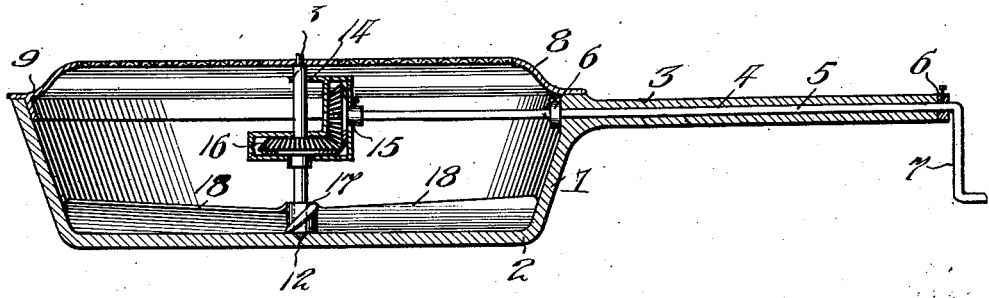

Figure 1 is a top plan view of a corn popper constructed in accordance with my invention, Fig. 2 is a vertical longitudinal section of the same.

Referring particularly to the accompanying drawings, my improved corn popper comprises a container 1, including a skillet body 2 having the usual handle 3. The container is preferably in the form shown in order that it may be readily adapted for use with the ordinary heating stove or with any desired form of heater, it being understood, however, that I contemplate the use of the other features hereinafter described with any size or form of container.

The handle 3 is longitudinally formed with a bore 4, in which is revolubly mounted an operating shaft 5. The shaft at the respective ends of the handle is provided with limiting collars 6, whereby to prevent independent longitudinal movement of the shaft, and beyond the free end of the handle said shaft is provided with or bent into crank form, as at 7.

The container is provided with a cover comprising an annular ring 8 having a depending flange 9 to fit within the container, the central open portion of the ring being bridged by cross braces 10 and provided with screen sections 11, all as clearly shown in Fig. 1. The central portion of the bottom of the container is formed with a bearing depression 12, and the central portion of the cover with a bearing opening 13, said depression and opening receiving and supporting a shaft 14, hereinafter termed the blade shaft, that portion of the shaft projecting through the opening 13 being reduced in diameter to insure the retention of the shaft in operative position when the cover is in place on the container.

The relatively inner end of the operating shaft 5 is provided with a bevel gear 15, and the blade shaft 14 is also provided with a similar gear 16 arranged to mesh with the gear 15. The relatively lower end of the blade shaft is provided with a collar 17 from which radiates a series of blades 18, which may be in any desired size and length appropriate to the interior of the container. The blades are preferably thin metallic strips and are arranged at an angle to the vertical, inclining rearwardly and upwardly relative to the direction of rotation. In use, operation of the shaft 5, through the medium of the crank handle, will impart revolution to the blade shaft 14 and thereby to the blades 18. As these blades are disposed immediately adjacent the surface of the container bottom it is obvious that the material, such as kernels of corn, will be thoroughly and continuously agitated in the operation. By the angular disposition of the blades the grains are continually elevated from the heated surface, thereby insuring that all of the grains will be similarly heated and preventing any of the grains remaining in contact with the surface a sufficient time to become burned.

The screen portion of the cover permits inspection of the operation, while at the same time prevents the material within the container from escaping therefrom in the cooking operation.

The use of a corn popper such as described is of material advantage in popping corn, owing to the fact that the agitation is secured without moving the container, thereby permitting the latter to be submitted at all times to the most effective heat from the heater. Furthermore, the gear 15 and inner collar 6 may be removed from the operating shaft and the latter and also the other parts of the operating structure entirely removed from the container to permit the latter to be used for cooking purposes in which agitation of the contents is not essential.

Having thus described the invention what is claimed as new, is:—

1. The combination with a complete cooking utensil including a skillet body and connected handle, of agitating mechanism removably mounted in the body, and an operating shaft extending through the handle and removably connected to said mechanism, whereby said mechanism and shaft may be removed from the utensil to permit the ordinary uses of the latter.

2. A corn popper comprising a cooking utensil of skillet form including a body and handle, a cover for said body, a shaft loosely held between the cover and bottom of the body, agitators carried by the shaft, and a removable operating shaft mounted in the handle.

3. A corn popper comprising a cooking utensil of skillet form including a body and handle, a cover for said body, a shaft loosely held between the cover and bottom of the body, a series of inclined blades radiating from the shaft, and an operating shaft removably mounted in the handle.

In testimony whereof, I affix my signature in presence of two witnesses.

NICHOLS W. EMMER.

Witnesses:
  E. E. PHILLIPS,
  GUY ROBERTS.